June 11, 1963 C. PERNETTA 3,093,424
RECTILINEARLY GUIDED MEMBERS
Filed Sept. 11, 1961

INVENTOR
CHARLES PERNETTA
BY Mason, Kolehmainen, Rathburn & Wyss
ATTORNEYS

United States Patent Office 3,093,424
Patented June 11, 1963

3,093,424
RECTILINEARLY GUIDED MEMBERS
Charles Pernetta, 28 Bryanston, London W. 1, England
Filed Sept. 11, 1961, Ser. No. 137,413
Claims priority, application Great Britain Oct. 14, 1960
10 Claims. (Cl. 308—6)

The invention relates to improvements in rectilinearly guided members such as may be used in association with sliding or folding doors and panels, sliding seats, roller shutters, vehicle sliding roofs, sliding windows and the like.

An object of the invention is to provide a rectilinearly guided member substantially free from sliding friction, rattle, and consequent wear. It is also an object of the invention to provide such features within a minimum space requirement and at an economical cost.

According to the present invention a rectilinear guiding member comprises at least three rotatable members two of which are spaced apart free from peripheral contact with each other and axially mounted on a common part for engagement with a guide track member, while the third rotatable member is freely mounted in peripheral engagement with the other two members and a further guide track member.

At least one of the rotatable members or a part thereof may be composed of a resilient and/or flexible material so that a compressive force may be exerted between the members. The pitch circle diameters of the co-operating members may result in a substantially equal peripheral displacement of the members on engagement.

Figure 1:
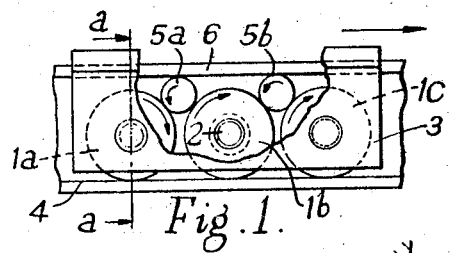
Figure 2:
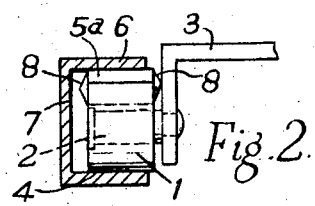
Figure 3:
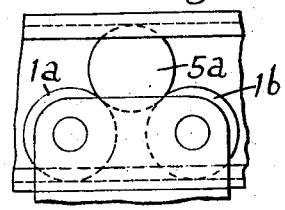
Figures 4, 5:
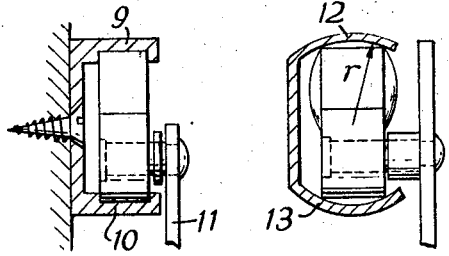
Figure 6:
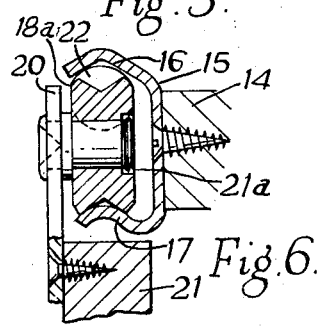
Figure 7:
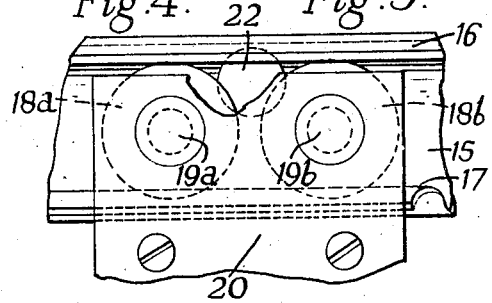
Figure 8:
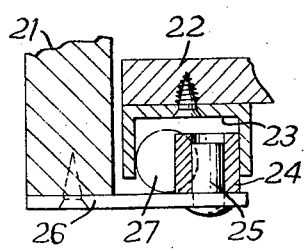
Figure 9:
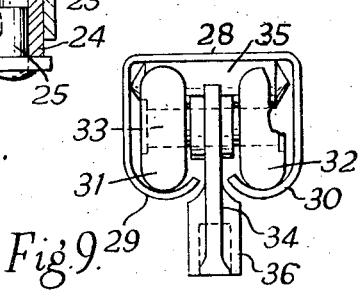
Figure 10:
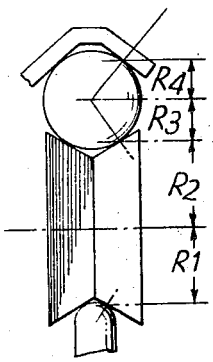

Several embodiments of the present invention will now be described by way of example with reference to the accompanying drawings in which:

FIG. 1 is a part sectional side view of one embodiment;
FIG. 2 is a sectional view taken on the line a—a of FIG. 1;
FIG. 3 is a side view of a further embodiment;
FIG. 4 is an end view of the embodiment shown in FIG. 3;
FIG. 5 is a view similar to FIG. 4 showing a further embodiment;
FIG. 6 is an end view of an embodiment suitable for a sliding door such as used in vehicles;
FIG. 7 is a side view of the embodiment shown in FIG. 6;
FIG. 8 shows the bottom part of the door shown in FIGS. 6 and 7;
FIG. 9 shows an embodiment provided with two co-axial rollers, and
FIG. 10 represents the geometric layout of the co-operating members of the various embodiments.

In FIGS. 1 and 2, three rollers 1a, 1b and 1c are axially mounted on spindles 2 projecting from a bracket or carriage 3 and their peripheries engage a guide track 4. Two freely mounted idler rollers 5a and 5b are in peripheral engagement with axially mounted rollers 1a and 1b, and 1b and 1c respectively while engaging with a guide track 6 mounted opposite to guide track 4. Upon linear displacement of the carriage 3 in the direction of the arrow in FIG. 1, rollers 1a, 1b and 1c rotate clockwise along track 4 to impart a counterclockwise rotation of the idler rollers 5a and 5b which will therefore roll along the track face 6 in the correct displacement without slip or friction. The rollers 1a, 1b, 1c, 5a and 5b may be of hard non-resilient material but it is preferred that at least one of the rotating members or parts thereof be of resilient material capable of a degree of compresibility or of a material having spring-like qualities so that a compressive force is exerted between the co-operating rollers and their respective tracks, at least sufficient to take up the manufacturing clearances between the members. For example one or both of the rollers 5a and 5b may be of a resilient compressible material such as natural or synthetic rubber or resilient synthetic plastic such as nylon, polyethylene, P.T.F.E. or similar materials, the degree of hardness being in accordance with the requirement of a particular application. In an alternative construction rollers 5a and 5b may be replaced by wire springs which are compressible axially and lengthwise. By such an arrangement vertical displacement of the carriage 3 is prevented thus eliminating rattle and wear of the members due to vibration.

The arrangement described above with reference to FIGS. 1 and 2 may be employed for a sliding seat, sliding window or slatted shutter in which case brackets or carriages 3 would be mounted to correspond to the upper and lower parallel edges of the seat, window or shutter. Lateral displacement of the bracket 3 is then best restricted by the rollers 5a and 5b engaging and being trapped between the face of the bracket 3 and a guide member 7 disposed at right angles between the tracks 4 and 6. The rollers 5a and 5b are of cone shape at their ends 8. To prevent lateral movement of the bracket or carriage 3, the rollers are constructed of resilient material so that the rollers are compressible between their cone shaped ends 8 and the guide member 7 and the bracket or carriage 3.

FIGS. 3 and 4 show recessed guide track members 9 and 10 which provide lateral guidance to bottom rollers 1a and 1b and a top idler roller 5a whereby a bracket 11 is subject to rigid guidance control. In FIG. 5, while lateral displacement of the carriage unit is prevented by the curvature of track members 12 and 13, the radius is such that the carriage unit is permitted a degree of self-alignment by pivoting about an axis. In all the above described examples the idler roller 5a or 5b may be replaced by a spherical ball. In FIG. 6, 14 represents the head rail of a vehicle to which is secured a track member 15 provided with a top guide 16 in the shape of an inverted V and a curved bottom guide 17 of convex configuration. V-shaped rollers 18a and 18b are axially mounted upon spindles 19a and 19b which are rivetted to a hanger bracket 20 to which a sliding door 21 is secured. The rollers 18a and 18b are retained on the spindles 19a and 19b by circlips 21a. The V shaped grooves provided in the periphery of the rollers 18a and 18b seats upon the bottom curved guide 17 but does not contact the top guide 16. The rollers 19a and 19b are spaced a distance apart to accommodate a spherical ball 22 which is freely assembled and located within the V grooves of both rollers and at the same time making contact with the V groove in guide 16. The carriage unit is therefore rigidly constrained against lateral movement in the track member 15 which may be straight or curved. One of the three rotating members, i.e. the rollers and ball, is preferably of resilient material, for example, the ball. The rollers may be entirely of hard but resilient material, or only the contacting faces be so made, thus ensuring silence in operation. With the sliding door 21 it is understood that usually two carriage units are provided adjacent each of its vertical edges, while the track length is approximately equal to twice the door width. FIG. 8 shows the bottom area of the door 21, shown in FIG. 6, 22 being the floor of the vehicle to the underside of which is secured an inverted channel shaped track 23 similar to the one illustrated in FIG. 2. Two rollers 24 are mounted on axial spindles 25 secured to a bracket 26 which is attached to the bottom of the door 21. A spherical ball 27 is freely mounted between the two rollers to engage their peripheries on the one part and one side of the channel 23 on the other part. It is to be noted that no guiding grooves are provided in the sides of the channel 23, nor is it necessary to retain the rollers on the spindles 25, since both the ball 27 and rollers 24 are trapped by the bracket 26 and the back of the channel 23. Vertical misalignment of the door 21 is taken up by the ball and rollers moving up and down the sides of the channel 23. Again, one of the three rotating members, for example, the ball 27, is preferably of resilient material.

The axially mounted rollers, in certain heavy load carrying applications, may have an additional co-axially mounted roller guided in a separate parallel track, the load carrying bracket being suspended between the two co-axial rollers. Such an arrangement is shown in FIG. 9 where a channel shaped track 28 has two track guides 29 and 30 carrying two rollers 31 and 32 respectively which are axially mounted on a spindle 33 attached to a bracket 34. A similar pair of rollers, spaced apart from the first, are mounted on the bracket 34 as previously described with reference to FIG. 6. An idler roller 35 is interposed between the two sets of axially mounted rollers 31 and 32 and is in peripheral engagement with them and the back face of track 28. In this embodiment, the bracket 34 is provided with a threaded boss 36 mounted centrally between the two pairs of axially mounted rollers, to provide a swivel connection to a member, such as a door, which whilst being guided along the path of the track 28 is required to pivot about its point of attachment. As will be appreciated this swivel connection may apply to any of the previously described embodiments, in place of the fixed connection.

It is within the scope of the invention to provide any shape of axially mounted rotatable member engaging with any shape or part thereof of a co-operating linear track member and any shape of non-axially mounted rotatable member in engagement with any part of the axially mounted members and any shape or part thereof of a co-operating track member. It is however to be observed that the contacting pitch circle diameters of the co-operating parts must result in an approximately equal peripheral displacement of the parts in engagement. For example, with reference to FIG. 10 which illustrates the geometrical layout of the co-operating members, it is necessary substantially to follow the relationship.

$$\frac{R_2}{R_1} = \frac{R_3}{R_4}$$

where $R_1$, is the distance between the axis of the axially mounted member and its point of contact with the co-operating track member, $R_2$ is the distance between the axis of the axially mounted member and its point of contact with the non-axially mounted member, $R_3$ is the distance between the axis of the non-axially mounted member and its point of contact with the axially mounted member, and $R_4$ is the distance between the axis of the non-axially mounted member and its point of contact with the co-operating track member. Only by observing such a relationship is it possible to ensure that pure rolling action takes place between the co-operating parts, free from slip, friction, and wear.

In certain applications of the members it is necessary to provide either semi-positive or positive locking of the carriage in pre-determined positions along the track, either in one direction or both directions. It is within the scope of this invention to provide means for semi-positive locking by providing indents or notches in the guide track for engaging either the axially mounted rollers or the idler rotating member. For example, if the idler member is of a compressive nature, and an indent is provided in its co-operating track it will engage and disengage the indent under force. Again, angles of contact between the idler member and the indent can cause the idler member to positively engage the indent in one or both directions, to be released by extraneous means imparting a releasing movement to the idler member. For example, assuming that FIG. 2 represents a cross section in plan view of a vertically sliding window and that guide track 6 is indented to engage the roller 8 which is spring biased against downward travel, then release from such engagement could occur from extraneous means urging the roller upwards against a non-locking angle of the indent. The extraneous means could be attached to the carriage and operated to a finger pull. Such an arrangement would allow the window to lock in predetermined downward locations, to be released by extraneous means for further downward displacement, whilst upward displacement would be effected without recourse to such extraneous means. Alternatively a two-way lock may be provided by a spring urged extraneous member urging the idler member into positive two way locking indent in the track, release taking place by operation of the extraneous member to return the idler member to its original position.

I claim:

1. A rectilinear guiding means comprising two opposing track members and at least three rotatable members, two of which are axially mounted on a common part and spaced apart to be free from peripheral contact with each other and engaging with one of the guide track members, and the third of said rotatable members being freely mounted in peripheral engagement with said two rotatable members and with the opposing guide track member.

2. A rectilinear guiding means as set forth in claim 1 above, wherein at least one of the rotatable members is formed of resilient material.

3. A rectilinear guiding means as set forth in claim 1 above, wherein the contacting pitch circle diameter of the cooperating parts produces an approximately equal peripheral displacement of the parts in engagement.

4. A rectilinear guiding means as set forth in claim 3, wherein the relationship between the contacting faces of the cooperating parts is:

$$\frac{R_2}{R_1} = \frac{R_3}{R_4}$$

wherein $R_1$ is the distance between the axis of one of said two rotatable members and its point of contact with the cooperating guide track member; $R_2$ is the distance between the axis of said one of said two rotatable members and its point of contact with said third rotatable member; $R_3$ is the distance between the axis of said third rotatable member and its point of contact with said one of said two rotatable members, and $R_4$ is the distance between the axis of said third rotatable member and its point of contact with the cooperating guide track member.

5. A rectilinear guiding means comprising two opposed guide track members, at least three rotatable members, two of which are axially mounted on a common part and spaced apart to be free from peripheral contact with each other and engaging one of the guide track members while the third rotatable member is freely mounted in peripheral engagement with the other two axially mounted members and with the opposing guide track member, wherein one of the three rotating members is of a compressive nature so that a compressive force is exerted between the rotating members and the opposing guide track members when the latter are spaced apart a distance which is less than the overall contacting surfaces of the three rotatable members.

6. A guiding means as set forth in claim 5 above, wherein the guide track members are provided with guiding means for constraining at least one of the rotatable members.

7. A rectilinear guiding means as set forth in claim 5 above, wherein the said two axially mounted rotatable members are in the form of rollers.

8. A rectilinear guiding means as set forth in claim 5 above, wherein the said third rotatable member is in the form of a freely mounted roller cone-shaped at its opposite ends.

9. A rectilinear guiding means as set forth in claim 5 above, wherein the said two rotatable members are in the form of rollers and the said third rotatable member is in the form of a spherical ball.

10. A rectilinear guiding means comprising two opposed track members, at least three rotatable members, two of which are axially mounted on a common part and spaced apart to be free from peripheral contact with each other and engaging with one of the guide track members while the third rotatable member is freely mounted in peripheral engagement with the said two members and the opposing guide track member wherein the said two members are provided with V-shaped peripheries in engagement with a curved cross-sectional guide track member while the said third member is a spherical ball freely located to engage within the V-shaped periphery of the said two members and a V-shaped groove in said opposing guide track member.

References Cited in the file of this patent

UNITED STATES PATENTS

| | | |
|---|---|---|
| 318,125 | Manuel | May 19, 1885 |
| 1,232,577 | Lester | July 10, 1917 |